United States Patent
Johnson et al.

(10) Patent No.: US 10,915,960 B1
(45) Date of Patent: Feb. 9, 2021

(54) USER INTERFACE FOR QUALITATIVE RISK PROFILE DETERMINATION

(71) Applicant: Wells Fargo Bank, N.A., San Francisco, CA (US)

(72) Inventors: Jessica Michelle Johnson, Richfield, MN (US); Julianne Pierson, Prior Lake, MN (US); Tyler Jacob Martel, Chanhassen, MN (US); Brandyn Tyler Hardt, Minneapolis, MN (US); Christina Ann Parks, Shoreview, MN (US); James H. Maatman, Blaine, MN (US); Kanwaljit Khurana, Huntersville, NC (US); James E. Price, Bluffton, SC (US); Jeffrey Peter Sampson, Stacy, MN (US); David James Ogg, Ramsey, MN (US); Colleen Marie Bouthilet, Lake Elmo, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 465 days.

(21) Appl. No.: 15/484,411

(22) Filed: Apr. 11, 2017

(51) Int. Cl.
*G06Q 40/06* (2012.01)
*G06T 11/20* (2006.01)
*G06F 3/0484* (2013.01)
*G06F 3/0488* (2013.01)

(52) U.S. Cl.
CPC ............ *G06Q 40/06* (2013.01); *G06T 11/206* (2013.01); *G06F 3/0488* (2013.01); *G06F 3/04842* (2013.01); *G06F 3/04847* (2013.01)

(58) Field of Classification Search
CPC ... G06Q 40/06; G06T 11/206; G06F 3/04842; G06F 3/04847; G06F 3/0488
See application file for complete search history.

(56) References Cited

U.S. PATENT DOCUMENTS

| | | | | |
|---|---|---|---|---|
| 5,918,217 A | * | 6/1999 | Maggioncalda ... | G06Q 30/0601 705/36 R |
| 6,282,520 B1 | * | 8/2001 | Schirripa ............... | G06Q 40/06 705/36 R |
| 6,939,137 B1 | * | 9/2005 | Colaio ................... | G06Q 20/10 434/107 |

(Continued)

FOREIGN PATENT DOCUMENTS

| WO | WO-0127844 A1 | 4/2001 |
| WO | WO 0143037 | * 6/2001 |

OTHER PUBLICATIONS

Chuah, Behavioural economics and financial services marketing: a review, 2011, The International Journal of Bank Marketing 29.6: 456-469. Emerald Group Publishing Limited. (Year: 2011).*

*Primary Examiner* — Hani M Kazimi
*Assistant Examiner* — Abdulmajeed Aziz
(74) *Attorney, Agent, or Firm* — Schwegman Lundberg & Woessner, P.A.

(57) ABSTRACT

Examples of a system and method may generally provide a graphical user interface for qualitative risk profile determination. A method may include providing a graphical user interface including a plurality of related qualitative graphs. The method may include receiving a selection from a user of one of the plurality of related qualitative graph and automatically determining a risk profile for the user. The risk profile may be provided on the graphical user interface.

19 Claims, 5 Drawing Sheets

(56) References Cited

U.S. PATENT DOCUMENTS

| | | | | |
|---|---|---|---|---|
| 7,707,092 B1* | 4/2010 | Freed | ................... | G06Q 40/06 705/36 R |
| 8,165,948 B2* | 4/2012 | O'Shaughnessy | ... | G06Q 20/102 705/36 R |
| 8,352,347 B2* | 1/2013 | Howard | ................... | G06Q 40/06 705/35 |
| 8,498,928 B2* | 7/2013 | Padgette | ................ | G06Q 10/04 705/38 |
| 2002/0198809 A1* | 12/2002 | Daley | ................... | G06Q 40/00 705/36 R |
| 2003/0088489 A1* | 5/2003 | Peters | ................... | G06Q 40/06 705/36 R |
| 2003/0208427 A1* | 11/2003 | Peters | ................... | G06Q 40/025 705/36 R |
| 2008/0065561 A1* | 3/2008 | Ethridge | ................ | G06Q 10/10 705/36 R |
| 2011/0270780 A1* | 11/2011 | Davies | ................... | G06Q 40/06 705/36 R |
| 2013/0108997 A1* | 5/2013 | Wright | ............... | G06Q 30/0203 434/236 |
| 2014/0188763 A1* | 7/2014 | Willis | ................... | G06Q 40/06 705/36 R |
| 2015/0149387 A1* | 5/2015 | Schreiber, Jr. | ......... | G06Q 40/06 705/36 R |
| 2015/0161733 A1* | 6/2015 | Emsbo-Mattingly | ........................ | G06Q 40/06 705/36 R |
| 2015/0278954 A1* | 10/2015 | Suri | ...................... | G06Q 40/06 705/36 R |
| 2016/0098530 A1* | 4/2016 | Dill | ....................... | G06F 19/328 705/3 |
| 2017/0330279 A1* | 11/2017 | Ponzone | ................ | G06Q 40/06 |
| 2018/0060956 A1* | 3/2018 | Felberbaum | .......... | G06F 3/0484 |
| 2018/0225765 A1* | 8/2018 | Wakeman | .............. | G06Q 40/06 |

* cited by examiner

USER INTERFACE FOR QUALITATIVE RISK PROFILE DETERMINATION

TECHNICAL FIELD

This disclosure generally relates to providing a graphical user interface and in particular, relates to providing a graphical user interface for conducting a qualitative risk assessment.

BACKGROUND

Risk assessment is an important part of determining investment strategies. Often new investors are unaware of their risk preferences. Current techniques to help new investors determine risk preferences include cumbersome, challenging, difficult, confusing, or repetitive questionnaires with many unknown words. Other techniques require in-person or online meetings with financial advisors, which are time consuming and expensive. Many new investors opt out of taking these difficult steps and remain ignorant to their risk preferences, potentially exposing themselves to undesirable outcomes.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

When determining investment and retirement strategies, people are often at a loss as to how to determine how much risk to take. By developing a risk profile, an investor is able to evaluate risks associated with potential investments. However, in order to develop a risk profile, investors are often asked complex and difficult questions that are not easily understood. To a sophisticated investor, developing a risk profile may not be difficult, but to a typical investor, risk questions may include unknown financial vocabulary or concepts that are confusing and result in a risk determination that may not reflect the typical investor's actual risk profile. By having a potentially erroneous risk determination, the typical investor may make investments that are too risky or have too low of an upside for the typical investor.

A technical problem arises in providing a typical investor with the opportunity to determine a risk profile, namely that a qualitative risk assessment may not be performed over a phone and may be impracticable or require too much time to perform in person. A graphical user interface with an intuitive and easy to understand risk assessment is described herein to determine a user's risk profile. The graphical user interface is a technical solution for providing a qualitative questionnaire over the internet to solve this technical problem. The risk profile generated using the qualitative questions on the graphical user interface may be used to guide the investor in purchasing securities or other investments based on riskiness of those securities or other investments.

A qualitative graph may represent a corresponding risk profile. For example, a qualitative graph may be stored in a database with a corresponding risk profile. A technique may include retrieving risk profiles corresponding to selected qualitative graphs. The retrieved risk profiles may be combined, according to a technique to produce a risk profile for a user who selected the qualitative graphs. The user's risk profile may be output on a display device, for example using a qualitative graph, explanatory text, a quantitative graph, or the like.

The corresponding risk profile may be qualitative, for example "low," "medium," and "high," or may be represented quantitatively, such as by using financial transactions (e.g., historical performance of a security or an index, such as the S&P or the Dow Jones Industrial Average, etc.), a range (e.g., a maximum and minimum value specified for a time period, for example a range of $3 change within a week, or the like). The risk profile may be displayed to a user after the user has selected one or more qualitative graphs.

The user may select a plurality of qualitative graphs, which may represent different risk profiles. The different risk profiles may be averaged, or otherwise combined (e.g., disregarding outliers), to create a risk profile for the user. The qualitative risk profiles (e.g., low, medium, high) may correspond with degree of fluctuation of a security or asset tolerated by a user. For example, a low risk profile may correspond with a low tolerance for fluctuation of asset price (e.g., swings in asset price up or down limited to a conservative amount of change, for example 5% over a year). A high risk profile may correspond with a high tolerance for fluctuation of asset price (e.g., swings in asset price up or down of up to 100% of the asset price, or greater). A medium risk profile may correspond with any profile between a low risk profile and a high risk profile. The medium risk profile may be further broken down into medium low, medium, and medium high, or different modifiers may be used. For example, numerical risk profiles (e.g., risk profile 1, risk profile 2, risk profile 3, etc.) may be used instead of or in addition to descriptive qualifiers (e.g., low, medium, high, risky, safe, conservative, betting, etc.).

A qualitative graph may represent more than one risk profile. For example, a qualitative graph may include a high upside and medium downside risk. A risk profile for a user may be determined using a plurality of qualitative graphs to determine whether the user changes risk profile given changes in rewards or downsides. For example, a user may select a qualitative graph representing a high upside and medium downside and a qualitative graph representing a low upside and a low downside, but avoid a qualitative graph representing a medium upside with a medium downside. These selections may indicate that the user is not comfortable with a medium downside risk, unless the reward is greater than the risk. The risk profile for this type of user may be indicated as a low risk profile, despite the user choosing a qualitative graph representing a medium downside and high upside, as that may be seen as a disproportionate risk to reward ratio. In another example, a user may select a qualitative graph representing a high upside and medium downside and a qualitative graph representing a high upside and a high downside, but avoid a qualitative graph representing a medium upside with a medium downside. The risk profile for this type of user may be indicated as a high risk profile, as it may be determined that the user is willing to accept any risk in exchange for possibility of high rewards. Fluctuations within a qualitative graph may be used to illustrate temporary risk or reward spikes, while retaining a more moderate risk profile overall.

Figure 1:
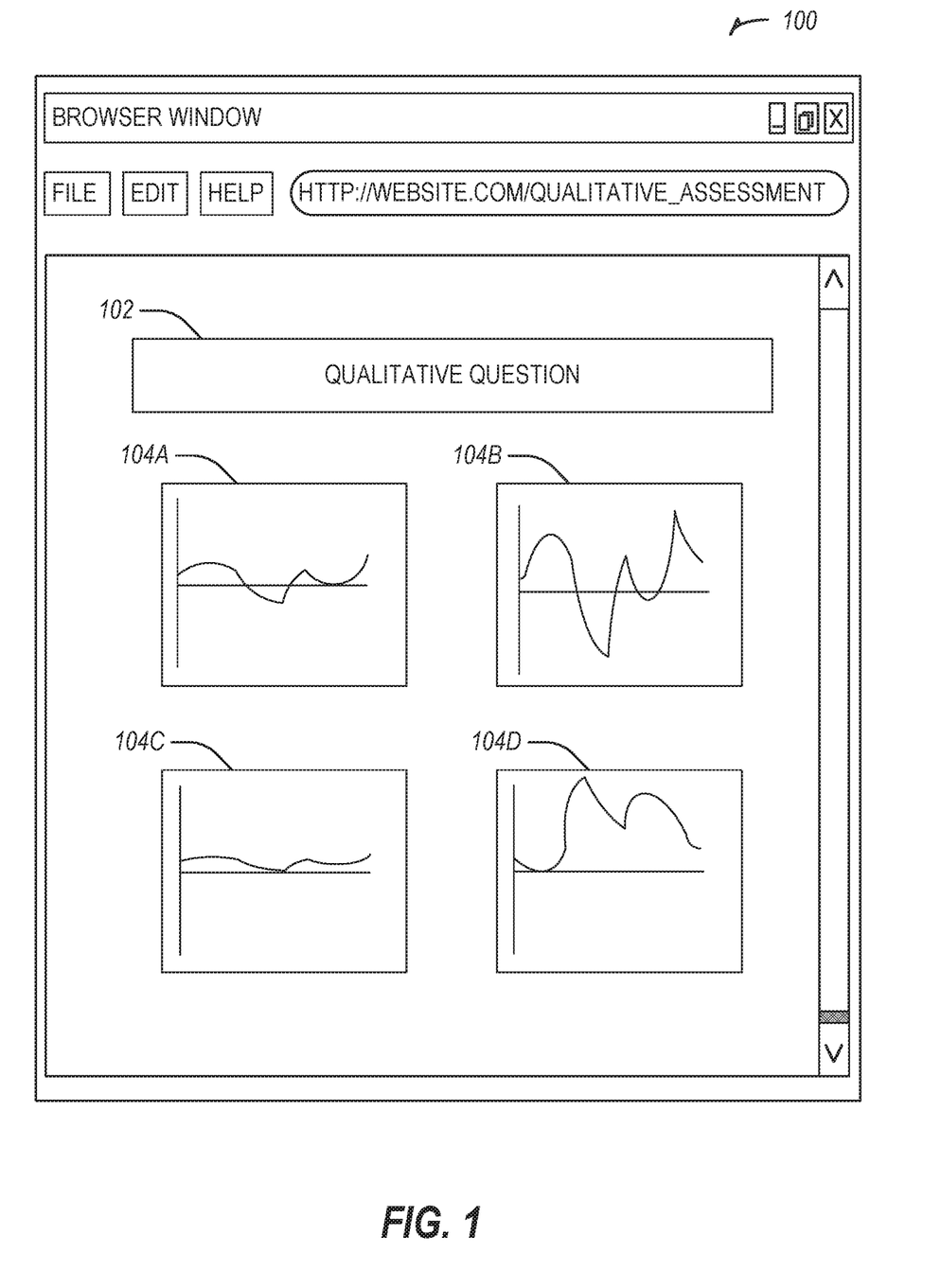
FIG. 1 illustrates a graphical user interface that includes a plurality of qualitative graphs in accordance with some embodiments.

FIG. 1 illustrates a graphical user interface 100 that includes a plurality of qualitative graphs in accordance with some embodiments. The graphical user interface 100 may be presented in a browser directed to a website to display one or more qualitative questions, for example, qualitative question 102. The qualitative question 102 includes a plurality of qualitative graphs 104A-104D. The plurality of qualitative graphs 104A-104D may be selected to answer the qualitative question 102. For example, a user may select one or more of the plurality of qualitative graphs 104A-104D using the graphical user interface 100. Once a selection is made, a risk attribute of the selected qualitative graph or the qualitative question 102 may be retrieved and the risk attribute or information about the risk attribute may be added to a risk profile of the user. A plurality of qualitative questions may be asked using the graphical user interface 100 (e.g., two, five, ten, etc.), and the risk profile of the user may be determined based on answers to the plurality of qualitative questions.

The qualitative question 102 may include a time frame, such as movement of an investment over a day, a week, a month, a year, or longer. Thus, certain aspects of the qualitative question 102 or the qualitative graphs 104A-104D may be quantified. The qualitative graphs 104A-104D may still be considered qualitative as long as at least one axis of the graph is not quantified. For example, when x-axis of the qualitative graph 104A represents a timeframe (e.g., a day), the y-axis may be unmarked (e.g., including no reference marks, labels, numbers, etc.) or unquantified (e.g., including tick marks but without labels), leaving 104A a qualitative graph. In another example, both axes may be unquantified in a qualitative graph. The plurality of qualitative graphs 104A-104D are represented in two dimensions in the graphical user interface 100, but they may be three-dimensional as well. In three-dimensions, one, two, or all three of the axes are unmarked or unquantified to create a qualitative graph.

In an example, the qualitative question 102 may include asking the user to select a qualitative graph based on an emotional reaction of the user to the plurality of qualitative graphs 104A-104D, such as "select the graph that you would feel most comfortable representing your portfolio." In another example, the qualitative question 102 may include asking the user about past performance of the user's portfolio, such as "select the graph that most closely matches the historical performance of your portfolio." In yet another example, the qualitative question 102 may include asking the user to select a graph the user believes most closely represents an ideal portfolio performance. Still other questions may be asked of the user, such as to select one or more graphs that make the user uncomfortable or that the user thinks would be bad investments. The quantitative question 102 may include repeating questions with different sets of qualitative graph answers to better define or narrow down a risk profile of the user.

Other example qualitative questions include asking which of the plurality of qualitative graphs 104A-104D make a user most feel an emotional response. For example, "which graph makes you feel most scared, excited, peaceful, worried, etc. In an example, qualitative questions may include "which graph shows an acceptable monthly loss for you?" or "which graph are you comfortable with for a daily volatility (amount moved up and down) for you?" Different questions may be asked for retirement investments, or for other investments, such as targeted investments for specific reasons (e.g., a college fund, a boat fund, a house fund, a car fund, a vacation fund, etc.) or for investments in general.

The plurality of qualitative graphs 104A-104D may include a graph (or set of graphs) representing actual past performance of the user's investments. The plurality of qualitative graphs 104A-104D may represent benchmarks or indices (e.g., the S&P index, inflation, a savings account, commodities, emerging markets, high yield securities, etc.). The benchmarks or indices may have different levels of riskiness or yield, which may be used to illustrate different risk profiles in the plurality of qualitative graphs 104A-104D. In an example graph 104A may represent a graph associated with a moderate risk profile (e.g., a medium chance for the underlying asset to go lower, but a moderately limited upside), while graph 104C may represent a graph associated with low risk profile (with low upside). The graph 104B may represent a graph associated with a high risk profile with a high upside. Graph 104D may be associated with a high risk profile as well, though it does not go below a median line. Large volatility, such as represented in graph 104D compared to low volatility represented in graph 104C, may correspond with high and low risk profiles respectively. Though both stay above the median line, they may represent different risk profiles one of which may be preferred by a user.

In another example, a graph (e.g., 104A-104D) may include a slider for user interaction with the graph on the graphical user interface 100. The graph may be used to represent different risk profiles as the slider is moved. A user may move the slider to select a graph (e.g., rather than selecting from a plurality of graph choices, such as 104A-104D). The slider may be used to change the appearance of the graph on the graphical user interface 100. For example, positioning the slider at a first position may cause a graph to be shown that represents extremely high risk and positioning the slider at a second position at an opposite end may cause a graph to be shown that represents a low risk. The user is presented with the slider to allow the user to move among the different graphs (or along a spectrum of graphs) to select a graph, though the user may be unaware of the representation of risk profiles by the graph selected.

In an example, the slider may be used to change a slope of the graph to change the underlying risk profile of the graph. The slider may be moved by a user to fine-tune the risk profile according to a comfort level of the user. For example, a narrowed range of potential risk profiles may be determined based on other questions or previously asked qualitative questions. The narrowed range may be represented using the slider such that the user may fine-tune the final risk profile within the narrowed range of risk profiles, which may give the user a sense of control. The slider may move the graph between representations of extremes of the narrowed range of risk profiles. For example, if a user answers a plurality of qualitative questions indicating the user is most comfortable with, or would benefit most from, a medium risk profile, the narrowed range may include medium risk profiles that vary from each other with higher or lower relative risk, but remain within an overall medium risk profile (e.g., when compared to risky or risk-adverse risk profiles).

In an example, preliminary questions may be asked of the user in order to change what is displayed in the qualitative graphs 104A-104D. For example, the preliminary questions may not be qualitative, but may instead be factual. For example, a user may be asked: how many kids do you have, what age are they, how old are you, are you married, what investments is this risk profile intended to represent (e.g., retirement account, college fund, speculation, or the like), etc. These preliminary questions may include questioning the user easily answerable questions that do not require thought or decisions to be made. The qualitative graphs 104A-104D may then be selected or altered according to answers to the preliminary questions. For example, if a user is close to retirement (e.g., the user's age is 60 or above, for example), then the qualitative graphs 104A-104D, while still representing different choices the user may make for an individualized risk profile, may represent only medium and low risk options, removing graphs associated with high risk options from being selected. In this way, the user may be protected from making a choice that may be inappropriate for the user while also retaining the individuality of the risk profile to the user.

Figure 2:
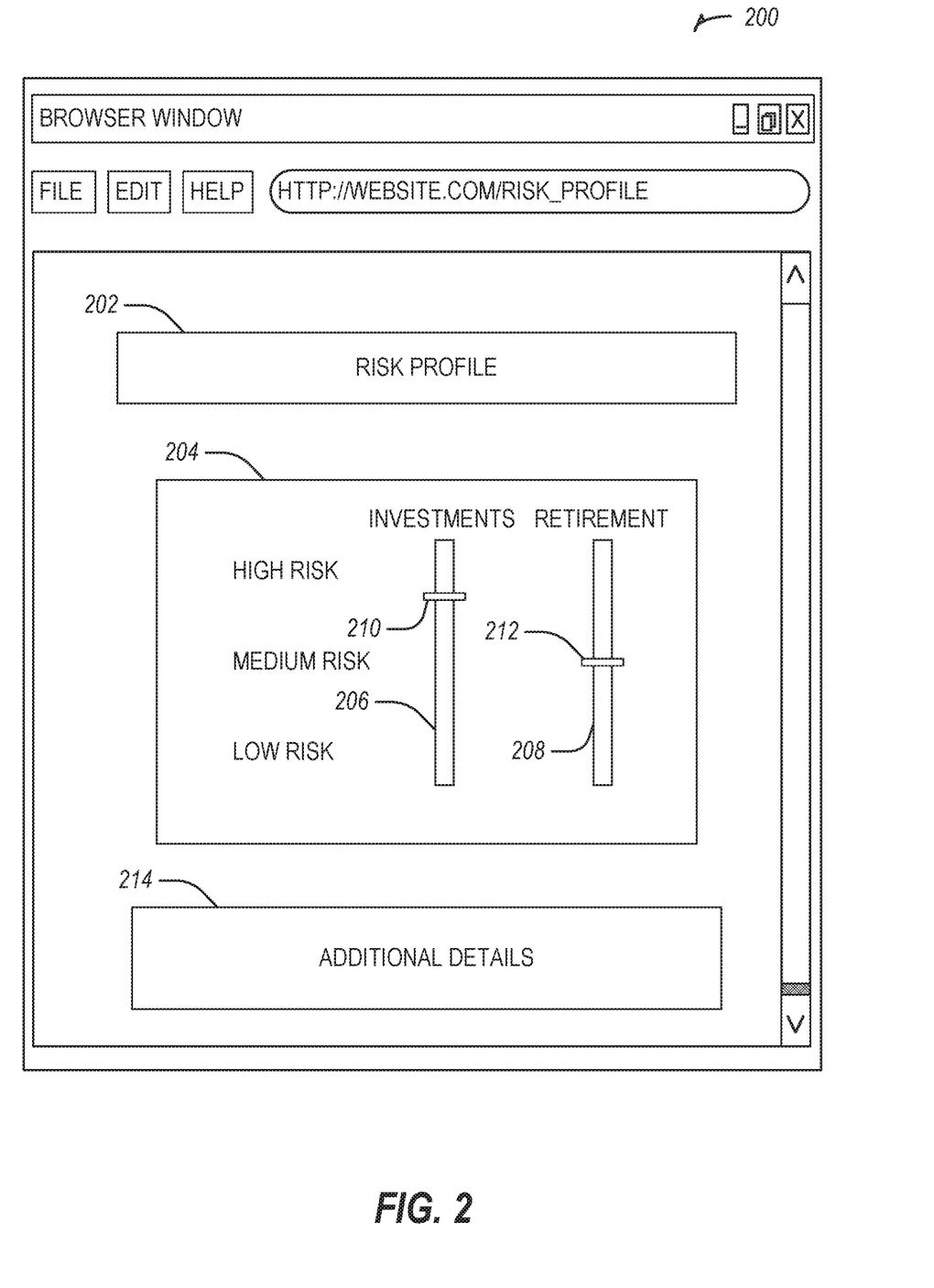
FIG. 2 illustrates a graphical user interface that includes a risk profile in accordance with some embodiments.

FIG. 2 illustrates a graphical user interface 200 for presenting a risk profile in accordance with some embodiments. The graphical user interface 200 includes a risk profile 202, including an analysis component 204 and a details component 214. The graphical user interface 200 may include investment opportunities or suggestions based on the risk profile 202.

The analysis component 204 may include separate information for investments and for a retirement account. In another example, a single risk profile assessment may be shown. The investments risk assessment bar 206 and the retirement risk assessment bar 208 include an investments risk indicator 210 and a retirement risk indicator 212, respectively. In the example shown on the graphical user interface 200, the investments risk indicator 210 indicates a higher riskiness in the risk profile 202 than the retirement risk indicator 212. For example, the investments risk indicator 210 indicates the user is willing to accept a medium-high risk for general investments, but only a medium risk for retirement investments.

The details component 214 may include additional information about the risk profile 202 of the user. For example, the details component 214 may include a short synopsis of the user's risk profile (e.g., text information, one or more graphs representing potential performance of investments within this risk profile), or the like. The details component 214 may include relevant assets that the user may wish to purchase that fit within the risk profile. The relevant assets may individually fit within the risk profile or may fit within the risk profile in combination, and may be presented individually or in combination respectively. The details component 214 may include a general fund risk value, including a link to a third party to purchase the general fund (e.g., mutual fund, exchange-traded fund, index, etc.). The details component 214 may include a mix of investment assets that may be purchased by the user to achieve the risk profile. In an example, the details component 214 may include examples of how assets are rated, such as how stocks are rated, mutual funds are rated, bonds are rated, and may include the risk profile of one or more of those particular assets. For example, the details component 214 may display types of assets that fall into the user's risk profile, and display assets that the user should look for when purchasing assets. The details component 214 may show recommendations for particular assets, and may include a monetary value for purchasing the assets. For example, the details component 214 may include a recommendation to purchase $100 a month in high risk stocks, and $200 a month in low risk bonds for a medium risk profile.

In an example, the user may be asked to take the qualitative questions (e.g., as discussed with respect to FIG. 1) to evaluate the user's risk profile on a periodic basis (e.g., once a month, once a quarter, or once a year). Previous risk profiles may be used as a starting point for determining a user's current risk profile. The previous risk profiles may be modified to create a new risk profile. Changes to the risk profile from previous versions may be shown in the graphical user interface 200. For example, if the user has a less risky current risk profile than a previous risk profile, changes to a portfolio of the user may be recommended. The current risk profile and one or more previous risk profiles may be shown on the graphical user interface 200 to show progression over time of the user's risk tolerance.

Figure 3:
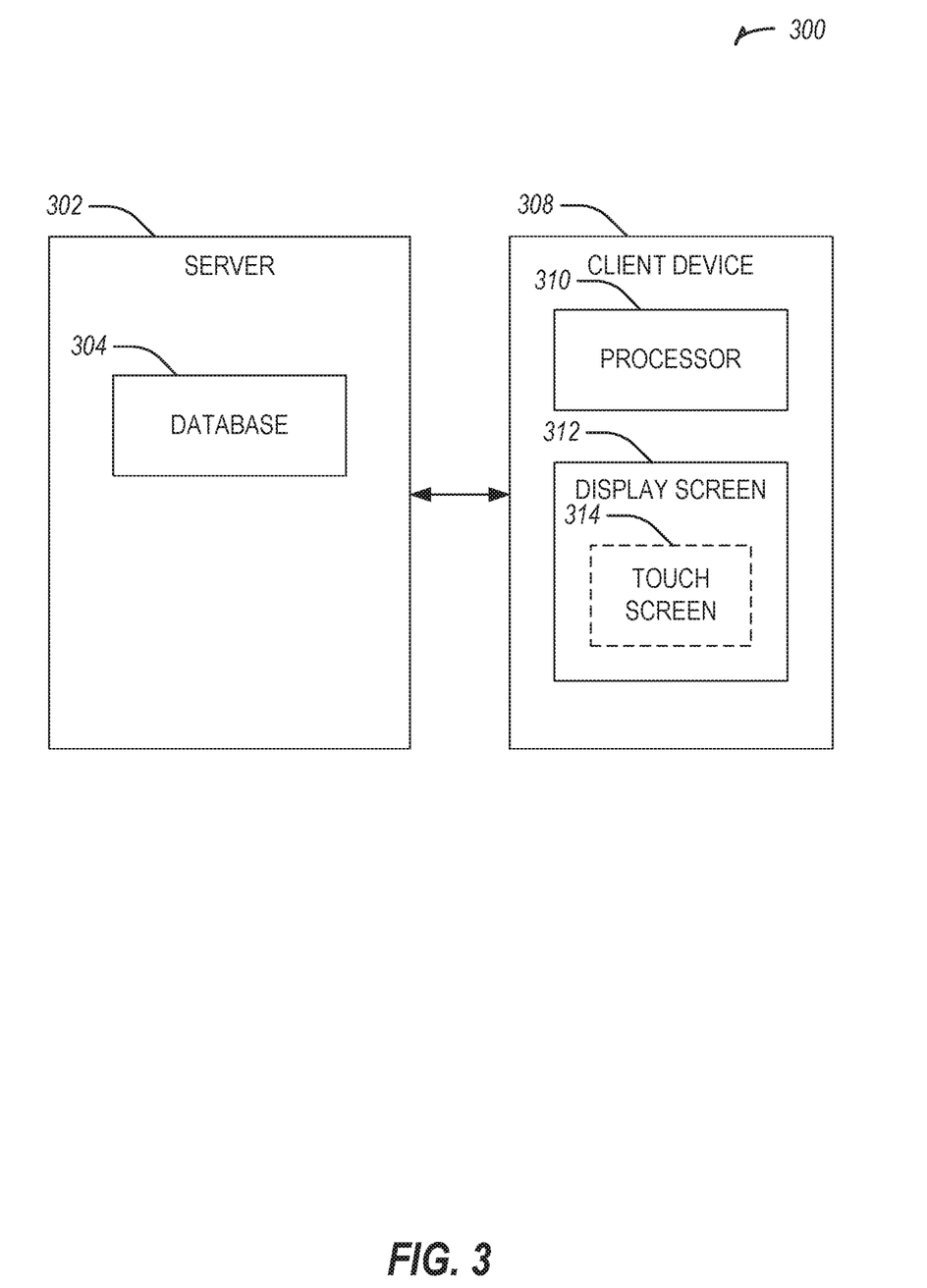
FIG. 3 illustrates a system for qualitative risk assessment in accordance with some embodiments.

FIG. 3 illustrates a system 300 for qualitative risk assessment in accordance with some embodiments. The system 300 includes a server 302 in communication with a client device 308 (e.g., a computer, a mobile device, a tablet, etc.). The server 302 includes a database 304. The database 304 may store qualitative graphs, risk profiles, and information connecting a particular qualitative graph to a particular risk profile or type of risk profile. The database 304 may be queried by sending a request to the server 302 for a qualitative graph. For example, the client device 308 may send a request for qualitative graphs to the server 302, which may retrieve from the database 304 and send back to the client device 308, the qualitative graphs and optionally respective risk profile information for the qualitative graphs.

The display device includes a processor 310 and a display screen 312, which may include a touch screen 314. The processor 310 may generate a graphical user interface including a related qualitative graphs (e.g., a first plurality or a second plurality) for display on a display screen (e.g., the display screen 312). The processor 310 may receive a user selection indicating a selected graph, such as one of the first or second plurality of related qualitative graphs. The processor 310 may automatically determine a risk profile for the user, such as based on a selected one of the first plurality of related qualitative graphs and a selected one of the second plurality of related qualitative graphs. The risk profile may be automatically determined in response to receiving the first and second user selections. The processor 310 may provide or output the risk profile, such as by sending the risk profile to the client device 308 for display on the display screen 312.

In an example, the first or second plurality of related qualitative graphs may be presented without axis labels. In another example, the first plurality of related qualitative graphs are selected or altered by the processor 310 based on predetermined demographic factors of the user. The predetermined demographic factors of the user may indicate an attribute of the user, such as an age, a career, a salary, a marital status, a number of children, ages of children, or the like. The processor may increase or decrease a range of potential risk for the risk profile based on the attribute. For example, in accordance with a determination that the age of the user is above a first threshold, the range may be decreased and in accordance with a determination that the age of the user is below a second threshold, the range may be increased.

The processor 310 may generate the first plurality of related qualitative graphs to illustrate respective losses of capital (e.g., related to financial products) over a time period (e.g., a day, a week, a month, a year, etc.). The processor 310 may generate the second plurality of related qualitative graphs to illustrate a volatility of a financial product (e.g., a financial product) over a time period (e.g., a day, a week, a month, a year, etc.). The processor 310 may create a targeted portfolio of securities based on the risk profile. The processor 310 may provide, such as on the graphical user interface (e.g., using the display screen 312), a recommendation including an investment security or an investment strategy based on the risk profile. The processor 310 may provide education information related to riskiness of various securities, such as for display on the graphical user interface (e.g., using the display screen 312) in response to the processor receiving the first and second user selections.

The processor 310 may evaluate a current portfolio of the user. In an example, the processor 310 may provide, such as for display on the graphical user interface, a recommended change to the current portfolio based on the risk profile. The graphical user interface may include a slider to facilitate a user selection of a qualitative risk. An indication that the slider was moved or released at a particular qualitative risk selection may be sent to the processor 310.

In an example, the risk profile is automatically determined to indicate a high risk aversion when the one of the first plurality of related qualitative graphs and the one of the second plurality of related qualitative graphs illustrate low risk investments and returns. In another example, the risk profile is automatically determined to indicate a medium risk aversion when the one of the first plurality of related qualitative graphs illustrates high risk investments and returns and the one of the second plurality of related qualitative graphs illustrates low risk investments and returns. In yet another example, the risk profile is automatically determined to indicate a low risk aversion when the one of the first plurality of related qualitative graphs and the one of the second plurality of related qualitative graphs illustrate high risk investments and returns.

The display screen 312 may display a graphical user interface, such as including a first plurality of related qualitative graphs and a second plurality of related qualitative graphs. The processor 310 of the client device 308 may be used to receive a user selection, such as a first selection indicating one of the first plurality of related qualitative graphs and a second selection indicating one of the second plurality of related qualitative graphs. The processor 310 may automatically determine a risk profile for the user, such as based on the selected one of the first plurality of related qualitative graphs and the selected one of the second plurality of related qualitative graphs. The risk profile may be automatically determined in response to receiving the first and second user selections. The processor 310 may provide or output the risk profile for display on the display screen 312.

The processor 310 may generate the first plurality of related qualitative graphs to illustrate respective losses of capital (e.g., related to financial products) over a time period (e.g., a day, a week, a month, a year, etc.). The processor 310 may generate the second plurality of related qualitative graphs to illustrate a volatility of a financial product (e.g., a financial product) over a time period (e.g., a day, a week, a month, a year, etc.). The processor 310 may create a targeted portfolio of securities based on the risk profile. The processor 310 may provide, such as for display on the graphical user interface of the display screen 312, a recommendation including an investment security or an investment strategy based on the risk profile. The processor 310 may provide education information related to riskiness of various securities, such as for display on the graphical user interface of the display screen 312 in response to the processor receiving the first and second user selections.

The processor 310 may evaluate a current portfolio of the user. In an example, the processor 310 may provide, such as for display on the graphical user interface, a recommended change to the current portfolio based on the risk profile. The graphical user interface may include a slider to facilitate a user selection of a qualitative risk. An indication that the slider was moved or released at a particular qualitative risk selection may be sent to the processor 310.

In an example, the risk profile is automatically determined to indicate a high risk aversion when the one of the first plurality of related qualitative graphs and the one of the second plurality of related qualitative graphs illustrate low risk investments and returns. In another example, the risk profile is automatically determined to indicate a medium risk aversion when the one of the first plurality of related qualitative graphs illustrates high risk investments and returns and the one of the second plurality of related qualitative graphs illustrates low risk investments and returns. In yet another example, the risk profile is automatically determined to indicate a low risk aversion when the one of the first plurality of related qualitative graphs and the one of the second plurality of related qualitative graphs illustrate high risk investments and returns.

The touch screen 314 of the display screen 312 may be used to receive the user selections. In an example, a slider may be presented on a graphical user interface of the display screen 312. The slider may be controlled using the touch screen 314. When the slider is moved, the touch screen 314 may send an indication to the device processor 310. In response, the device processor 310 may provide a change in a displayed qualitative graph (or provide a new qualitative graph) corresponding to the movement in the slider. For example, when the slider is moved to a first extreme position, a high risk profile may be indicated and a representative qualitative graph may be displayed or when the slider is moved to a second extreme position opposite the first extreme position, a low risk profile may be indicated and a representative qualitative graph may be displayed. A slider position in the middle of the slider may indicate a medium risk profile. The client device 308 may include a computer, a tablet, a mobile device (e.g., mobile phone), or the like.

Figure 4:
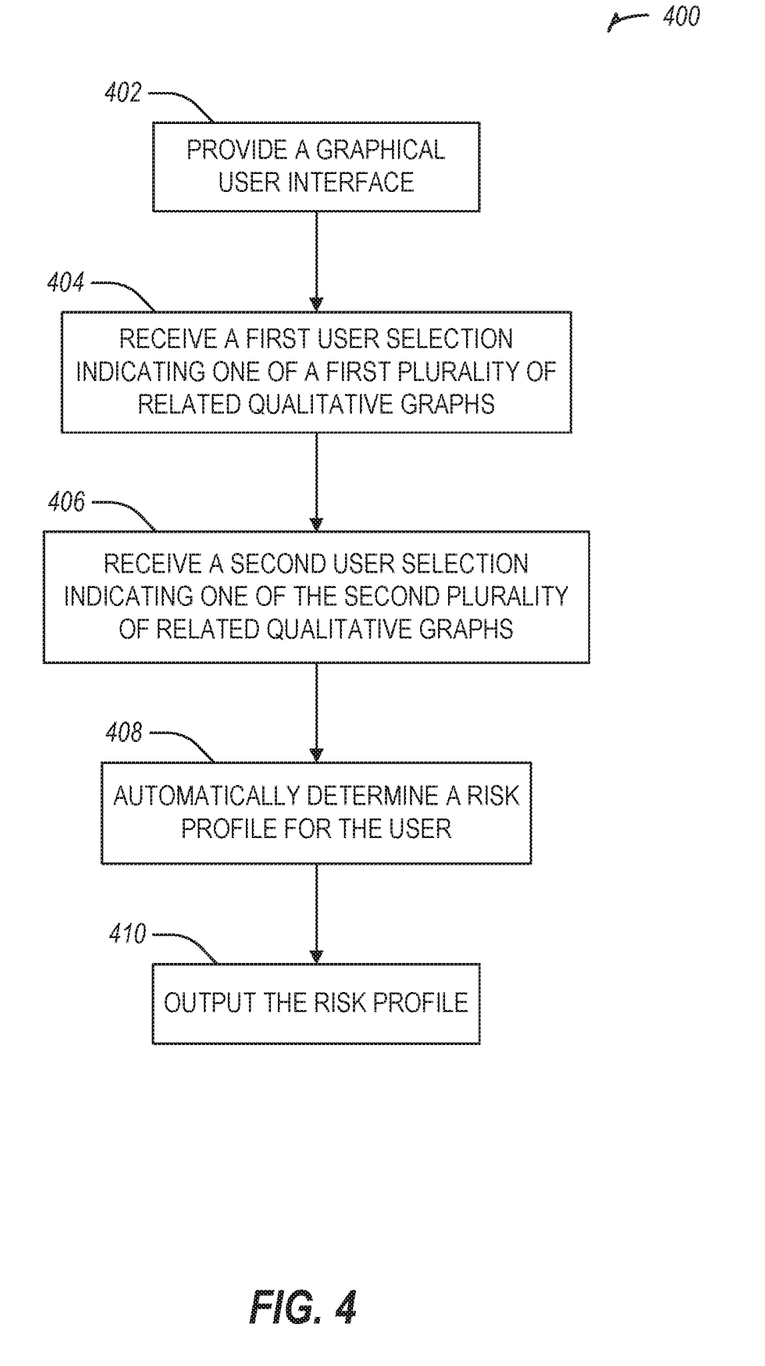
FIG. 4 illustrates a flowchart showing a technique for qualitative risk assessment in accordance with some embodiments.

FIG. 4 illustrates a flowchart showing a technique 400 for qualitative risk assessment in accordance with some embodiments. The technique 400 includes an operation 402 to provide a graphical user interface. Providing the graphical user interface may include providing a first plurality of related qualitative graphs. The technique 400 includes an operation 404 to receive a first user selection indicating one of the first plurality of related qualitative graphs. The technique 400 may include an operation to provide for display on the graphical user interface, a second plurality of related qualitative graphs. The technique 400 includes an operation 406 to receive a second user selection indicating one of the second plurality of related qualitative graphs.

The technique 400 includes an operation 408 to automatically determine a risk profile for the user. The risk profile may be automatically determined in response to receiving the first and second user selections. The risk profile may be automatically determined based on the one of the first plurality of related qualitative graphs and the one of the second plurality of related qualitative graphs (that are selected by the user). In an example, the risk profile is automatically determined to indicate a high risk aversion when the one of the first plurality of related qualitative graphs and the one of the second plurality of related qualitative graphs illustrate low risk investments and returns. In another example, the risk profile is automatically determined to indicate a medium risk aversion when the one of the first plurality of related qualitative graphs illustrates high risk investments and returns and the one of the second plurality of related qualitative graphs illustrates low risk investments and returns. In yet another example, the risk profile is automatically determined to indicate a low risk aversion when the one of the first plurality of related qualitative graphs and the one of the second plurality of related qualitative graphs illustrate high risk investments and returns. The first and second plurality of related qualitative graphs may be presented without a legend or without axis labels.

The technique 400 includes an operation 410 to output the risk profile. Outputting the risk profile may include providing the risk profile for display on the graphical user interface. The technique 400 may include an operation to generate the first plurality of related qualitative graphs to illustrate respective losses of capital over a time period (e.g., a day, a week, a month, a year, etc.). The respective losses of capital may be related to financial products. The technique 400 may include an operation to generate the second plurality of related qualitative graphs to illustrate a volatility of a financial product over a time period (e.g., a day, a week, a month, a year, etc.). The technique 400 may further include providing a recommendation, such as for display on the graphical user interface, including an investment security or an investment strategy based on the risk profile. The technique 400 may further include presenting on the graphical user interface education information related to riskiness of various securities in response to receiving the first and second user selections.

Figure 5:
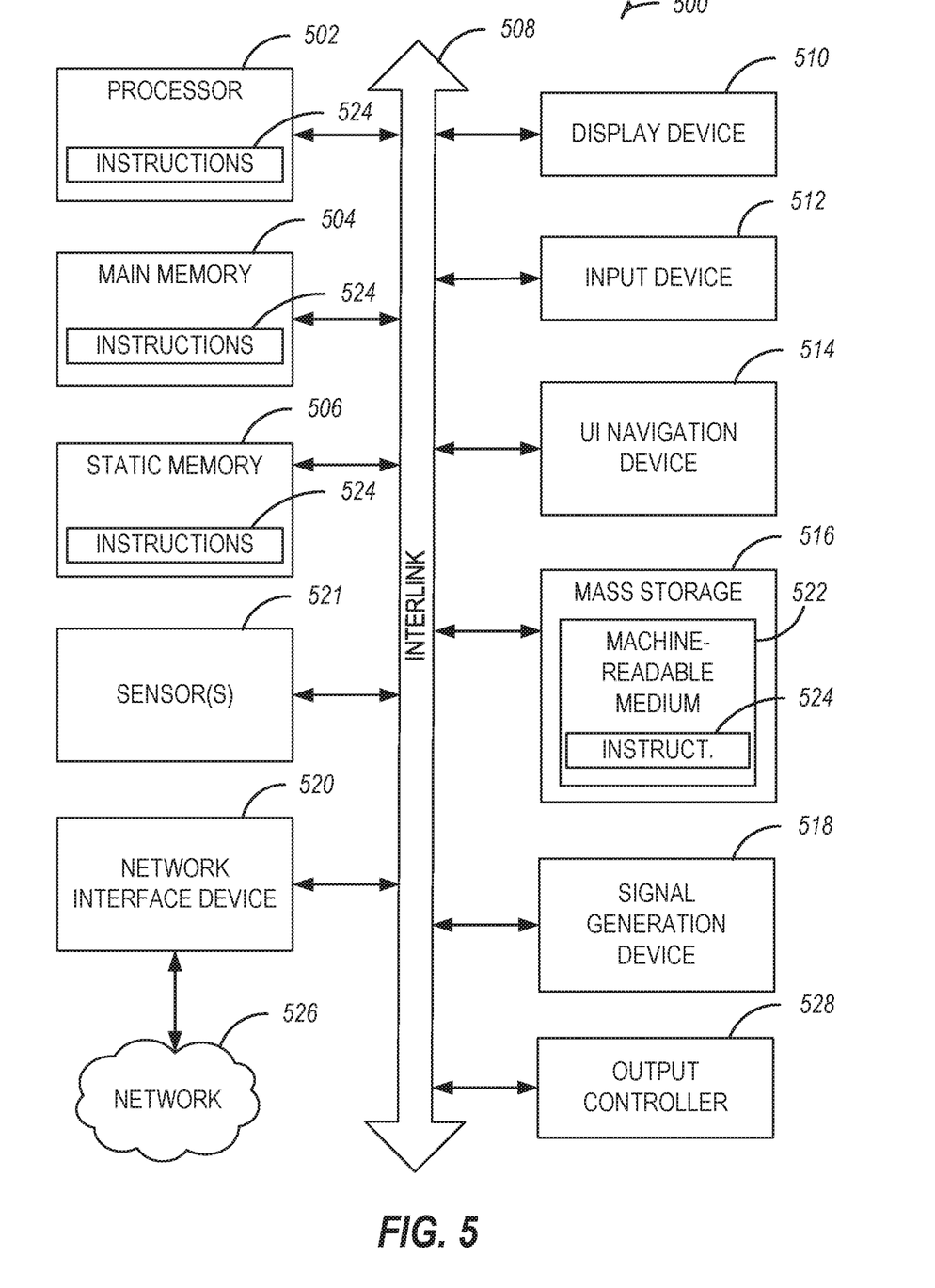
FIG. 5 illustrates generally an example of a block diagram of a machine upon which any one or more of the techniques (e.g., methodologies) discussed herein may perform in accordance with some embodiments.

FIG. 5 illustrates generally an example of a block diagram of a machine 500 upon which any one or more of the techniques (e.g., methodologies) discussed herein may perform in accordance with some embodiments. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, alphanumeric input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 that is non-transitory on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A system comprising:
    one or more processors coupled to a memory device, the memory device containing instructions that, when executed by the one or more processors, cause the system to:
        generate for a user a graphical user interface comprising:
            a first plurality of related qualitative graphs for display on a display screen, wherein for each of the first plurality of related qualitative graphs, at least one axis is not quantified, and wherein each of the first plurality of related qualitative graphs map to a respective risk profile; and
            a first slider bar controllable to adjust a volatility of a respective one of the first plurality of related qualitative graphs within a first volatility range, wherein the first slider bar is configured to visually represent the first volatility range;
        receive a first user selection identifying one of the first plurality of related qualitative graphs;
        provide, on the graphical user interface, a second plurality of related qualitative graphs, wherein each of the second plurality of related qualitative graphs map to a respective risk profile;
        provide, on the graphical user interface, a second slider bar controllable to adjust a volatility of a respective one of the second plurality of related graphs within a second volatility range narrower than the first volatility range, wherein the second slider bar is configured to visually represent the second volatility range, the visual representation of the second slider bar being different than the visual representation of the first slider bar;
        receive a second user selection indicating one of the second plurality of related qualitative graphs;
        access, from a database, first and second quantitative risk profiles using the first and the second user selections;
        automatically determine, by averaging the first and the second quantitative risk profiles, an overall risk profile indicative of an investment risk tolerance for the user; and
        provide, on the graphical user interface, the overall risk profile.

2. The system of claim 1, wherein the processor is further configured to generate the first plurality of related qualitative graphs, the first plurality of related qualitative graphs representing respective losses of capital over a time period.

3. The system of claim 2, wherein the respective losses of capital are related to financial products.

4. The system of claim 1, wherein the processor is further configured to generate the second plurality of related qualitative graphs to illustrate another volatility of a financial product over a time period.

5. The system of claim 1, wherein the first and second plurality of related qualitative graphs are presented without a legend and without axis labels.

6. The system of claim 1, wherein the processor is further configured to create a targeted portfolio of securities based on the overall risk profile.

7. The system of claim 1, wherein the processor is further configured to evaluate a current portfolio of the user and provide, for display on the graphical user interface, a recommended change to the current portfolio based on the overall risk profile.

8. The system of claim 1, wherein the first plurality of related qualitative graphs are altered by the processor based on predetermined demographic factors of the user.

9. The system of claim 8, wherein the predetermined demographic factors of the user indicate an age of the user, and wherein the processor is configured to:
    in accordance with a first determination that the age of the user is above a threshold, decrease a range of potential risk for the overall risk profile; and
    in accordance with a second determination that the age of the user is below the threshold, increase the range of potential risk for the overall risk profile.

10. A method comprising:
    using one or more hardware processors:
    providing for a user a graphical user interface comprising:
        a first plurality of related qualitative graphs, wherein for each of the first plurality of related qualitative graphs, at least one axis is not quantified, and wherein each of the first plurality of related qualitative graphs map to a respective risk profile; and a first slider bar controllable to adjust a volatility of a respective one of the first plurality of related qualitative graphs within a first volatility range, wherein the first slider bar is configured to visually represent the first volatility range;

receiving a first user selection identifying one of the first plurality of related qualitative graphs;

providing, on the graphical user interface, a second plurality of related qualitative graphs, wherein each of the second plurality of related qualitative graphs map to a respective risk profile;

providing, on the graphical user interface, a second slider bar controllable to adjust a volatility of a respective one of the second plurality of related graphs within a second volatility range narrower than the first volatility range, wherein the second slider bar is configured to visually represent the second volatility range, the visual representation of the second slider bar being different than the visual representation of the first slider bar;

receiving a second user selection indicating one of the second plurality of related qualitative graphs;

accessing, from a database, first and second quantitative risk profile using the first and the second user selections;

automatically determining, by averaging the first and the second quantitative risk profiles, an overall risk profile indicative of an investment risk tolerance for the user; and providing, on the graphical user interface, the overall risk profile.

11. The method of claim 10, further comprising: providing a recommendation, for display on the graphical user interface, including an investment security or an investment strategy based on the overall risk profile.

12. The method of claim 10, further comprising: presenting on the graphical user interface education information related to riskiness of various securities in response to receiving the first and second user selections.

13. The method of claim 10, wherein the first and second plurality of related qualitative graphs are presented without a legend and without axis labels.

14. A display device comprising:
a display;
at least one processor;
a storage device comprising instructions, which when executed on the at least one processor, configure the at least one processor to:
display, on the display device for a user, a graphical user interface comprising:
a first plurality of related qualitative graphs and a second plurality of related qualitative graphs, wherein for each of the first plurality of related qualitative graphs, at least one axis is not quantified, and wherein each of the first plurality of related qualitative graphs and the second plurality of quantitative graphs each map to a respective risk profile;
a first slider bar controllable to adjust a volatility of a respective one of the first plurality of related qualitative graphs within a first volatility range, wherein the first slider bar is configured to visually represent the first volatility range; and
a second slider bar controllable to adjust a volatility of a respective one of the second plurality of related graphs within a second volatility range narrower than the first volatility range, wherein the second slider bar is configured to visually represent the second volatility range, the visual representation of the second slider bar being different than the visual representation of the first slider bar;

receive a first user selection identifying one of the first plurality of related qualitative graphs;

receive a second user selection indicating one of the second plurality of related qualitative graphs;

access, from a database, first and second quantitative risk profiles using the first and the second user selections;

automatically determine, by averaging the first quantitative risk profile and the second quantitative risk profile, an overall risk profile indicative of an investment risk tolerance for the user; and output the overall risk profile on the graphical user interface.

15. The display device of claim 14, wherein the overall risk profile is automatically determined to indicate a high risk aversion when the one of the first plurality of related qualitative graphs and the one of the second plurality of related qualitative graphs illustrate low risk investments and returns.

16. The display device of claim 14, wherein the overall risk profile is automatically determined to indicate a medium risk aversion when the one of the first plurality of related qualitative graphs illustrates high risk investments and returns and the one of the second plurality of related qualitative graphs illustrates low risk investments and returns.

17. The display device of claim 14, wherein the overall risk profile is automatically determined to indicate a low risk aversion when the one of the first plurality of related qualitative graphs and the one of the second plurality of related qualitative graphs illustrate high risk investments and returns.

18. A non-transitory machine-readable medium including instructions, which when performed by a processor of a machine, cause the machine to:
generate for a user a graphical user interface comprising:
a first plurality of related qualitative graphs for display on a display screen, wherein for each of the first plurality of related qualitative graphs, at least one axis is not quantified, and wherein each of the first plurality of related qualitative graphs map to a respective risk profile; and
a first slider bar controllable to adjust a volatility of a respective one of the first plurality of related qualitative graphs within a first volatility range, wherein the first slider bar is configured to visually represent the first volatility range;

receive a first user selection identifying one of the first plurality of related qualitative graphs;

provide, on the graphical user interface, a second plurality of related qualitative graphs, wherein each of the second plurality of related qualitative graphs map to a respective risk profile;

provide, on the graphical user interface, a second slider bar controllable to adjust a volatility of a respective one of the second plurality of related graphs within a second volatility range narrower than the first volatility range, wherein the second slider bar is configured to visually represent the second volatility range, the visual representation of the second slider bar being different than the visual representation of the first slider bar;

receive a second user selection indicating one of the second plurality of related qualitative graphs;

access, from a database, first and second quantitative risk profiles using the first and the second user selections;
automatically determine, by averaging the first quantitative risk profile and the second quantitative risk profile, an overall risk profile indicative of an investment risk tolerance for the user; and
provide, on the graphical user interface, the overall risk profile.

19. The non-transitory machine-readable medium of claim 18, wherein the instructions further cause the machine to generate the first plurality of related qualitative graphs to illustrate respective losses of capital over a time period and the second plurality of related qualitative graphs to illustrate another volatility of a financial product over the time period.

\* \* \* \* \*